US007174912B2

(12) United States Patent
Lowe

(10) Patent No.: US 7,174,912 B2
(45) Date of Patent: Feb. 13, 2007

(54) SHUT-OFF VALVE ASSEMBLY

(76) Inventor: Howard Lowe, 30 Main Avenue, Wavell Heights, Queensland, 4012 (AU)

( * ) Notice: Subject to any disclaimer, the term of this patent is extended or adjusted under 35 U.S.C. 154(b) by 356 days.

(21) Appl. No.: 10/763,218

(22) Filed: Jan. 26, 2004

(65) Prior Publication Data

US 2004/0262552 A1    Dec. 30, 2004

Related U.S. Application Data

(63) Continuation-in-part of application No. PCT/AU02/00988, filed on Jul. 25, 2002.

(30) Foreign Application Priority Data

| Jul. 26, 2001 | (AU) | ............................. PR6642 |
| Aug. 22, 2001 | (AU) | ............................. PR7192 |
| Dec. 20, 2001 | (AU) | ............................. PR9699 |
| Jul. 4, 2003 | (AU) | ............................. 2003903419 |

(51) Int. Cl.
*F16K 51/00* (2006.01)

(52) U.S. Cl. ............... 137/434; 137/436; 137/558; 251/118; 251/127; 251/318

(58) Field of Classification Search ............... 137/434, 137/436, 442, 558; 251/318, 127, 129.21, 251/118

See application file for complete search history.

(56) References Cited

U.S. PATENT DOCUMENTS 218,325 A * 8/1879 Shannon ................. 251/127
812,030 A * 2/1906 Ericson ................. 251/127
5,289,846 A  3/1994 Elias et al.
6,536,465 B2 * 3/2003 David et al. ............ 137/442

FOREIGN PATENT DOCUMENTS

| DE | 2421897 | 7/1975 |
| DE | 3827766 | 9/1989 |
| FR | 2335765 | 7/1977 |
| FR | 2703133 | 9/1994 |
| GB | 1487803 | 10/1977 |
| WO | 99/14523 | 3/1999 |

* cited by examiner

*Primary Examiner*—Kevin Lee
(74) *Attorney, Agent, or Firm*—Hoffman, Wasson & Gitler, P.C.

(57) ABSTRACT

A shut-off valve assembly for regulating the flow of fluid through or from a fluid line. The assembly comprises: a body attachable to or within a fluid line and having a chamber therein with inlets and an outlet for fluid from the fluid line; a valve seat that provides the outlet; a baffle arrangement including a baffle housing; a valve member having a sealing member movable between a shielded position, whereby the sealing member is substantially shielded by the baffle housing from a fluid stream moving from the inlets to outlet, and an unshielded position, whereby the sealing member can be forced by the fluid stream against the valve seat to seal the outlet; and a solenoid-spring drive for moving the sealing member between the shielded and unshielded positions.

6 Claims, 9 Drawing Sheets

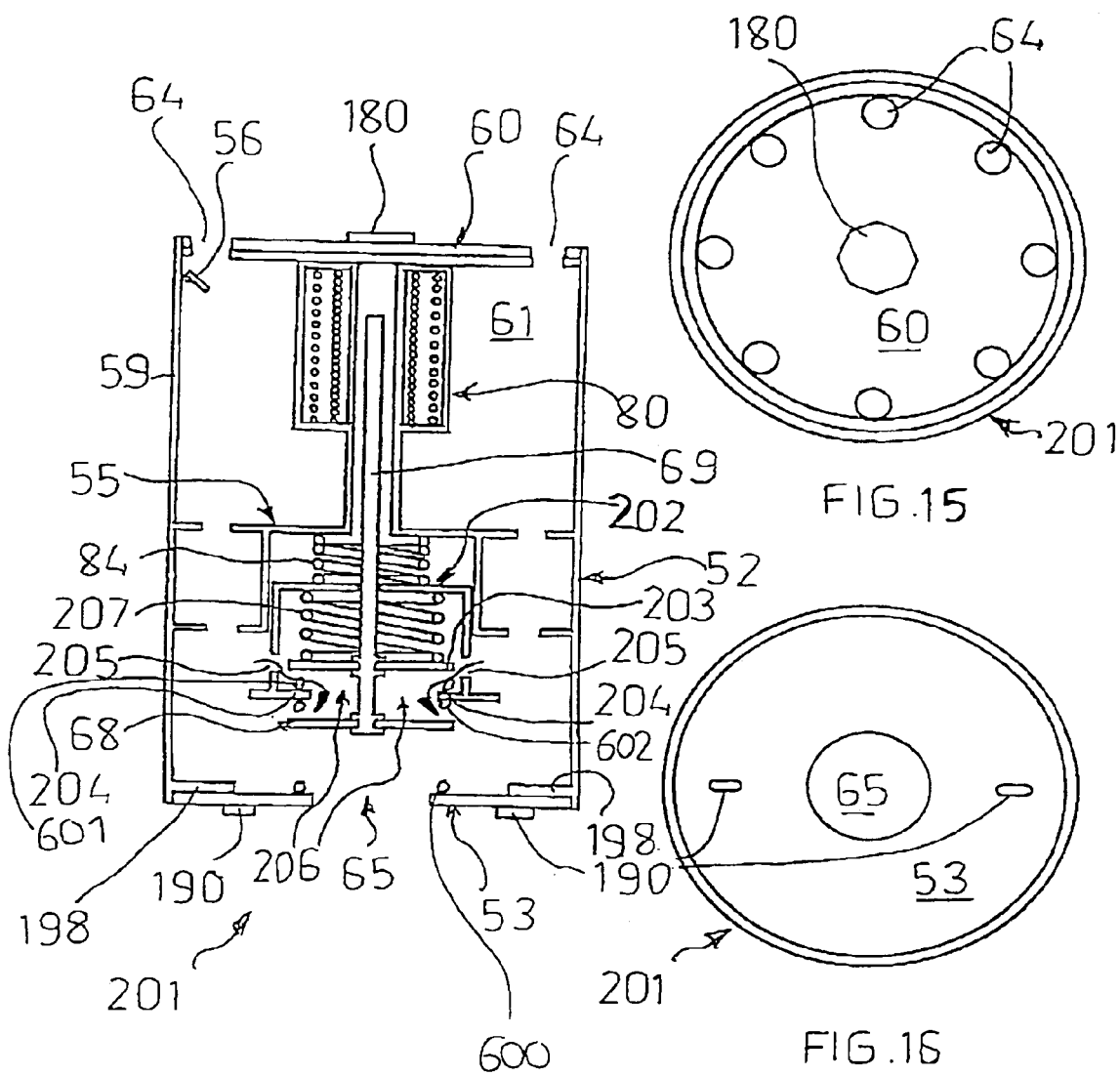

SHUT-OFF VALVE ASSEMBLY

This application is a continuation-in-part of international application PCT/AU02/00988 filed Jul. 25, 2002 which designated the U.S and additionally claims priority from Australian provisional patent application 2003903419 filed Jul. 4, 2003.

TECHNICAL FIELD

This invention relates to a shut-off valve assembly for regulating the flow of fluid through or from a tap or pipe or other type of fluid line.

BACKGROUND ART

A problem with most conventional taps is that if left on by accident, then fluid will continue to flow from the tap until the tap has been turned off or until the source of the fluid has depleted of fluid. An associated problem is that a receptacle (eg. basin, tub or sink) being filled with fluid may overflow and the fluid overflow may cause damage to surrounding benches, fixtures, flooring and furnishings.

Methods for preventing fluid overflows are known. One way in which an overflow can be prevented is to use a sink that has an overflow outlet. When the fluid level reaches the overflow outlet, the fluid level ceases to rise as the fluid simply drains through the overflow outlet.

Another method for preventing overflows entails using a sink plug having an overflow tube extending through the plug, wherein the tube extends to a point below a top rim of the sink. Overfilling the sink is prevented as fluid simply drains through the tube and plug into the sink outlet.

Although the above-mentioned methods may be effective in preventing overflows from occurring, the methods do not solve the primary problem that fluid will continue to flow from the tap until either the tap has been turned off or the source of the fluid is depleted of fluid.

SUMMARY OF THE INVENTION

It is therefore an object of the present invention to provide a shut-off valve assembly for controlling the flow of fluid through or from a tap or pipe or other type of fluid line. A preferred object of the present invention is to provide a shut-off valve assembly that minimizes or overcomes a problem referred to above.

In a broadest form of the invention, there is provided a shut-off valve assembly for regulating the flow of fluid through or from a fluid line, said assembly comprising:

a body attachable to or within a fluid line and having at least one chamber therein with at least one inlet and one outlet for fluid from the fluid line;

a valve seat that provides the outlet;

a baffle arrangement located within the chamber;

a valve member having a sealing member movable between a shielded position, whereby the sealing member is substantially shielded by the baffle arrangement from a fluid stream moving from said inlet to said outlet and in which position the sealing member is not movable by the fluid stream against the valve seat, and an unshielded position whereby the sealing member is movable by the fluid stream against the valve seat to seal the outlet; and a drive for moving the sealing member between the shielded and unshielded positions.

The fluid stream can consist of liquid or gas (or mixtures thereof), and in some instances particulate matter which has fluid movement.

The body can be attached to or within the fluid line (cg. tap or pipe) by any suitable means known to persons skilled in the art If the body is to be attached to an end of a threaded tap then the body can, for example, have a like threaded end Alternatively, the assembly can have a hydraulic coupling for quick and easy attachment of the body to a variety of unthreaded taps Such couplings are well known in the art. The body can have opposing threaded ends for attachment between adjacent pipes.

If the body is to be fitted within the fluid line itself, then the body can, for instance, have an outer threaded surface for attachment to a like-threaded inner surface of a pipe. Alternatively, the body can friction fit within a part of the fluid line, such as within an interior compartment of a tap.

The body can be of any suitable shape and size. The body can comprise two or more connecting pieces. Preferably, the body has a cylindrical sidewall and an attachable end cap, and the end cap has the inlet. The end cap can provide access to the valve member etc. for maintenance or replacement. If the body is to be attached to an end of a threaded tap, then the end cap can have a threaded spout and the inlet can be located at the end of the spout.

The baffle arrangement can comprise any suitable number and arrangement of baffle walls. Preferably, the baffle arrangement comprises a baffle housing. The baffle housing can be of any suitable size, shape and configuration. The baffle housing together with the body can define at least one passage through which fluid can flow to the outlet. The baffle housing can have a top wall and at least one sidewall, and the sidewall can extend from the top wall towards the valve seat. In one embodiment, the baffle housing can completely or partially house the sealing member when in the shielded position. In a preferred embodiment, the baffle housing is scaled when the sealing member is in the shielded position, and in the unshielded position, fluid from the fluid stream is able to flow between the baffle housing and the scaling member and move the sealing member against the valve seat to seal the outlet.

The inventor has found that the assembly works best if the sealing member seals the baffle housing in a fluid tight manner when in the shielded position.

The chamber can, if necessary, have flow restrictors for slowing the flow of fluid from the inlet to the outlet. Any suitable type of flow restrictor can be used. Preferably, the baffle arrangement comprises additional walls for slowing the flow of fluid. More preferably, perforated walls extend between the baffle housing and the body to slow fluid flow.

The valve member can be of any suitable shape and size. The sealing member can, for instance, be planar. The sealing member can be disk-shaped, it can have a support disk and it can have a rubber surface facing the valve seat. The rubber surface can be provided by, for instance, a disk of neoprene or like material, or a teflon O-ring. An opposing surface of the support disk can be dome-shaped.

The valve member can have a stem extending from the sealing member. Preferably, the stem is rod-shaped.

The sealing member, when in the shielded position, can seal the baffle housing in any suitable way. A peripheral region and/or other region of the sealing member can contact and seal the baffle housing. The point of contact can be within the baffle housing or external of the baffle housing. For instance, a sealing element (e.g. an O-ring) can extend about a periphery of the support disk and engage a sidewall of the baffle housing. The periphery of the support disk can have a groove within which extends an O-ring.

The valve seat can be of any suitable shape and size. The valve seat can have a rubber surface facing the sealing member. The rubber surface can be provided by, for instance, a layer of neoprene or like material, or an O-ring. The outlet can be provided by a central aperture of the valve seat. Alternatively, if the chamber has more than one outlet, then these can be provided by a plurality of apertures spaced about the valve seat. The apertures can be annually spaced about the valve seat. The valve seat can have an annual groove for receiving an O-ring of the sealing member, and one or more outlets can be located within the groove.

An outer periphery of the valve seat can be threaded and can be attached. to a like threaded region of the body, or between like threaded regions of the body.

The assembly can have a pressure relief valve for venting fluid from the chamber after the sealing member has sealed the outlet. Without a pressure relief valve it may be difficult to detach the assembly from the fluid line. Any suitable type of pressure relief valve arrangement can be used. The pressure relief valve can be in the form of a tap or a spring-loaded push-button valve that extends from the body. Spring-loaded push-button valves and the like are known in the art. Alternatively, the valve seat can have a pressure relief outlet that is sealable with a toggle. The toggle can have an aperture that can be aligned with the pressure relief outlet of the valve seat in order to vent fluid from the chamber. The toggle can extend through the body, and the aperture of the toggle can be positioned by sliding the toggle relative to the valve seat.

If the assembly does not have a pressure relief valve for venting fluid from the chamber, then the valve member can be adapted such that fluid can slowly leak between the sealing member and the stem.

Any suitable drive can be used to move the sealing member between the shielded and unshielded positions. In one embodiment, the drive comprises a float pivotally connected to the valve member. In another embodiment, the drive comprises at least one solenoid operatively connected to the valve member.

Components of the assembly can be made of brass, steel, ceramics, rubber or plastics material, or any other suitable type of material.

One or more of the above-mentioned features can be present in the preferred forms of the invention described hereafter.

According to a first preferred form of the present invention, there is provided a shut-off valve assembly for restricting the flow of fluid through or from a fluid line, said assembly comprising:

a body attachable to or within a fluid line and having at least one chamber therein with at least one inlet and one outlet for fluid from the fluid line;

a valve seat that provides the outlet;

a baffle arrangement located within the chamber;

a valve member having a sealing member movable between a shielded position, whereby the sealing member is substantially shielded by the baffle arrangement from a fluid stream moving from said inlet to said outlet and in which position the sealing member is not movable by the fluid stream against the valve seat, and an unshielded position whereby the sealing member is movable by the fluid stream against the valve seat to seal the outlet;

a drive that when energized moves the sealing member to the shielded position and when de-energized moves the sealing member to the unshielded position; and a control mechanism for selectively energizing or de-energizing the drive.

This first preferred form of the invention is particularly suitable for stopping the flow of fluid from or within a fluid line, such as the flow of water through a tap or shower head or oil through a pipeline. The assembly can be modified, upsized or downsized for any suitable application.

As mentioned above, the first preferred form of the invention can have one or more of the features described in respect of the broadest form of the invention. In particular, the assembly can have a body, a valve seat, a baffle arrangement and a valve member as described above.

Preferably, the baffle arrangement comprises a baffle housing which is sealed by the sealing member when in the shielded position and unsealed when the sealing member is in the unshielded position. That is, in the shielded position the fluid stream is unable to flow between the sealing member and the baffle arrangement. Preferably, the sealing member is disk shaped.

The drive can be of any suitable construction. Preferably, the drive comprises a solenoid, that when energized moves the sealing member to the shielded position, and a biasing member that moves the sealing member to the unshielded position when the solenoid is de-energized. With this arrangement, in the event of a power failure, the sealing member will seal the outlet.

The solenoid can be located between the inlet and the baffle housing. The solenoid can have a hermetically sealed casing. The valve member can have a stem extending from the sealing member and the solenoid can have a magnetic coil that is wound about the stem. The solenoid can be powered by any suitable power source, whether it is a mains supply, a battery, A.C. or D.C.

Any suitable type of biasing member can be used. Preferably, the biasing member comprises a spring, such as a coil spring that is wound about the stem, and the spring extends between the baffle housing and the sealing member.

Preferably, the control mechanism includes a sensor that, when triggered by fluid flowing through the chamber, energizes the drive to move the sealing member to the shielded position. Preferably, the sensor comprises a flow switch that closes an electrical circuit to energize the solenoid when fluid is flowing through the chamber, and if fluid is not flowing through the chamber, then the circuit is opened and the solenoid is de-energized. The flow switch can be mounted to a sidewall of the body.

The control mechanism can further comprise, for example, a battery that provides power to the solenoid for a predetermined period of time, a timer that shuts off power to the solenoid after a predetermined period of time, and/or signal transmitting/broadcasting and receiving units for operating the solenoid from a remote location.

In one embodiment of the invention, the control mechanism comprises a battery that provides power to the solenoid for a predetermined period of time. When the battery runs out of power, the solenoid is de-energized and the sealing member seals the outlet. Preferably, the battery is a rechargeable battery that can be charged to provide power to the solenoid for, say, 10, 20, 30 or 40 minutes. The battery can be integrated into the body of the assembly or can be remote from the body.

In another embodiment, the control mechanism comprises a timer that shuts off power to the solenoid after a predetermined period of time. Such timers are well known in the art and feature, for example, in stereo systems and video recorders. The timer can be programmable and can be integrated into the body of the assembly or can be remote from the body.

In another embodiment, the control mechanism comprises a timer that is programmable by way of a remote electronic terminal, such as an EFTPOS terminal A person can program the timer by way of the electronic terminal for a select period of time after swiping a credit card or like card through the electronic terminal.

In yet another embodiment of the invention, the control mechanism can comprise signal (eg. radio, microwave, infrared) transmitting/broadcasting and receiving units for operating the solenoid from a distance, even by satellite The control mechanism can comprise any combination of the above or any other suitable mechanism known to persons skilled in the art.

In some instances, the solenoid may not be strong enough to lift the sealing member from the valve seat without first providing some sort of pressure relief. Preferably, the assembly further including a pressure-relief arrangement for the chamber comprising:

a second sealing member attached to the stem;

a housing for the second sealing member having a valve seat and at least one fluid inlet adjacent to said valve seat; and a coil spring extending between the second sealing member and the housing, wherein when the chamber outlet is sealed, the second sealing member seals the valve seat of the housing and extends from within the baffle housing, and to de-pressurise the chamber the solenoid is energized to cause the second sealing member to move from its valve scat and for fluid to flow through the housing fluid inlet between said sealing members and through the housing valve seat, at which point the solenoid can also move the first sealing-member to the shielded position and retract the housing within the baffle arrangement against the force of the coil spring.

According to a second preferred form of the present invention, there is provided a shut-off valve assembly for restricting the flow of fluid from a fluid line into a receptacle when the fluid level within the receptacle reaches a predetermined level, said assembly comprising:

a body attachable to a fluid line and having an upper chamber and a lower chamber therein each with at least one inlet and one outlet for fluid from the fluid line;

a valve seat that provides the outlet for the upper chamber;

a baffle arrangement located within the upper chamber;

a valve member having a sealing member movable between a shielded position, whereby said sealing member is substantially shielded by the baffle arrangement from a fluid stream moving from the upper chamber inlet to the upper chamber outlet and in which position the sealing member is not movable by the fluid stream against the valve seat, and an unshielded position, whereby the sealing member is movable by the fluid stream against the valve seat to seal the upper chamber outlet; and a drive, comprising a float pivotally connected to the valve member, for moving the sealing member between the shielded and unshielded positions, with the construction and arrangement being such that when the float rises with the fluid level in a receptacle to a predetermined level, the scaling member moves to the unshielded position.

This second preferred form of the invention is particularly suitable for preventing basins, bathtubs, sinks and the like from overfilling with water.

The second preferred form of the invention can have one or more of the features described in respect of the broadest form of the invention.

Preferably, the baffle arrangement comprises a baffle housing which is sealed by the sealing member when in the shielded position and unsealed when the scaling member is in the unshielded position. That is, in the shielded position the baffle housing may contain an air pocket and the fluid stream is unable to flow between the sealing member and the baffle arrangement. Preferably, tie sealing member is disk shaped.

The valve member can have a stem, the valve seat can have a central opening through which extends the stem, and the stem can extend into the lower chamber. The stem can further extend through the lower chamber outlet.

The assembly can have a stem guide located within the lower chamber for guiding the movement of the stem. The stem guide can comprise a sleeve containing a bush, such as a nylon bush, and the stem can extend through the sleeve.

The stem guide can seal a lower end of the lower chamber, in which case the stem guide can further comprise a sealing element such as an O-ring through which the stem extends.

If the stem guide seals the lower end of the lower chamber, then the lower chamber outlet can be located at any other suitable location, such as at the sidewall of the body.

The drive can be of any suitable construction. Preferably, the drive further comprises a pivot arm that interconnects the stem and float and is pivotable relative to the body. The pivot arm can be of any suitable shape and size, it can be curved or linear. The pivot arm can be connected to the stem and float in any suitable way. The pivot arm can be pivotally connected to any suitable region of the body. The pivot arm can extend through an opening within a sidewall of the body.

The assembly can have a deflector located within the lower chamber for deflecting fluid away from the stem guide and for dispersing the fluid stream that may otherwise impede the pivoting action of the pivot arm. The deflector can be of any suitable shape and size. Preferably, the deflector extends from the valve seat, the stem guide is located within the deflector, and a lower end of the deflector extends through the lower chamber outlet and is pivotally connected to the pivot arm. More preferably, the deflector is of general cylindrical shape and a lower end of the deflector flares towards a sidewall of the body.

The float can comprise any suitable float known to persons skilled in the art. Preferably, the float is a ball float. The ball float can be made of polyurethane or any other suitable material.

Preferably, the pivot arm is adjustably connected to the float by way of a float arm that extends from the float. The float arm can be of any suitable shape and size. The float arm can extend substantially parallel to the stem. Preferably, the float arm is rod-shaped.

Preferably, the length of the float arm is adjustable or the point at which the float arm connects to the pivot arm can be adjusted so that the predetermined level can be adjusted for different types of receptacles. The float arm can, for instance, comprise two or more adjustably connecting pieces or the float arm can be telescopic. Alternatively, the float arm can, for instance, have beads spaced therealong and the pivot arm can clip to any one of the beads.

The assembly can have a float arm guide connected to the body for guiding the movement of the float arm. The float arm guide can be of any suitable shape and size. The float arm guide can comprise a sleeve containing a bush, such as a nylon bush, and the float arm can extend through the sleeve.

The pivot arm can have slots through which the stem and float arm can extend, and the stem and float arm can have retainers each side of the slots so that the float arm can pivot the pivot arm and the pivot arm can move the stem. If necessary, rubber or plastic washers can be fitted between the retainers and the slots.

Alternatively, the end of the pivot arm that is connected to the stem can be forked and a narrow neck of the stem can extend therebetween. Preferably, the length of the pivot arm between where the float arm connects and the point at which the pivot arm is connected to the deflector is about three times that of the length of the pivot arm between the said point and where the stem connects. According to a third preferred form of the present invention, there is provided a shut-off valve assembly for restricting the flow of fluid from a fluid line into a receptacle when a level of fluid within the receptacle reaches a predetermined level, said assembly comprising:

a body attachable to or within a fluid line and having at least one chamber therein with at least one inlet and one outlet for fluid from the fluid line;

a valve seat that provides the outlet;

a baffle arrangement located within the at least one chamber;

a valve member having a sealing member movable between a shielded position, whereby the sealing member is substantially shielded by the baffle arrangement from a fluid stream moving from said inlet to said outlet and in which position the sealing member is not movable by the fluid stream against the valve seat, and an unshielded position whereby the sealing member is movable by the fluid stream against the valve seat to seal the outlet;

a drive for moving the sealing member between the shielded and unshielded positions; and a sensor system including a first sensor for sensing the level of fluid within a receptacle, with the construction and arrangement being such that when the fluid in the receptacle rises to a predetermined level, the first sensor causes the drive to move the sealing member to the unshielded position.

This third preferred form of the invention is also particularly suitable for preventing basins, bathtubs, sinks and the like from overfilling with water.

The third preferred form of the invention can have one or more of the features described in respect of the broadest form of the invention.

The body can comprise a cylindrical sidewall, an end cap attachable to the sidewall, and the end cap can have a plurality of inlets for the chamber.

The drive can be of any suitable construction. Preferably, the drive comprises a solenoid, that when energized moves the sealing member to the shielded position, and a biasing member that moves the sealing member to the unshielded position when the solenoid is de-energized. With this arrangement, in the event of a power failure, the sealing member will seal the outlet.

Preferably, the baffle arrangement comprises a baffle housing which is sealed by the sealing member when in the shielded position and unsealed when the sealing member is in the unshielded position. Preferably, the sealing member is disk shaped.

The solenoid can be located between the inlets and the baffle housing. The solenoid can have a hermetically sealed casing. The valve member can have a stem extending from the sealing member and the solenoid can have a magnetic coil that is wound about the stem. The solenoid can be powered by any suitable power source, whether it is a mains supply, a battery, A.C. or D.C.

Any suitable type of biasing member can be used. Preferably, the biasing member comprises a spring, such as a coil spring that is wound about the stem, and the spring extends between the baffle housing and the sealing member.

The assembly can have a stem guide located within the chamber for guiding the movement of the stem. The stem guide can comprise a sleeve containing a bush, such as a nylon bush, and the stem can extend through the sleeve. Preferably, a stem guide extends between the solenoid and the baffle housing.

The first sensor is preferably wired such that the solenoid is de-energized when the fluid within the receptacle rises to the predetermined level. That is, when the first sensor detects the appropriate fluid level, an electrical circuit with the solenoid is opened.

The first sensor can comprise any suitable type of sensor known to persons skilled in the art. Preferably, the first sensor comprises a pressure-sensitive mat, a laser sensor, an infra-red light sensor, or a micro-switch that is triggered by a float that rises with the rising fluid level within the receptacle.

The first sensor can comprise a touch mat that is attachable to a sidewall of the receptacle. The touch mat can extend between a bottom wall and a top of the receptacle, and it can have multiple sensing points. Touch mats and other pressure-sensitive pads are well known in the art, and an example of such a mat is described in the specification of UK patent application no. 2254453, the entire contents of which are hereby incorporated by reference.

Alternatively, the first sensor can comprise a laser sensor that directs a laser beam towards a bottom wall of the receptacle, and when the fluid reaches a predetermined level within the receptacle, the solenoid de-energizes. The laser sensor can be mounted to the body or can be independent of the body. The body can, for instance, have mountings for both the laser sensor and a battery.

Devices incorporating laser sensors are well known in the art, and an example of such a device is described in the specification of international patent application no. PCT/US96/07495, the entire contents of which are hereby incorporated by reference.

Yet as another alternative, the first sensor can comprise a micro-switch and float arrangement. The float can be attached to the micro-switch by way of an arm of adjustable length, and when the float rises to the predetermined level within the receptacle the arm can trigger the micro-switch such that the solenoid is de-energized. The micro-switch and float can be connected to the body or can be independent of the body.

The sensor system can include a keypad/display unit (or the like) for programming what the predetermined level of fluid will be, for displaying the charge on the battery, and so forth. This unit can be integrated with the body and/or the first sensor, or the unit can be independent of both. The unit can be integrated with the receptacle.

Preferably, the sensor system further comprises a second sensor for sensing the flow of fluid through the chamber. Any suitable type of sensor can be used. Preferably, the second sensor comprises a flow switch that closes an electrical circuit to energize the solenoid when fluid is flowing through the chamber, and if fluid is not flowing through the chamber, then the circuit is opened and the solenoid is de-energized. The flow switch can be mounted to a sidewall of the body.

Preferably, the first sensor is wired so that it is only operational when the flow switch senses fluid flow. That is, when the flow switch senses flowing fluid, then an electrical circuit with the first sensor is closed. This feature can be of importance if the assembly is battery operated and power is to be conserved.

The outlet can be provided by a single central aperture of the valve seat. Alternatively, the chamber can have a plurality of outlets provided by a plurality of apertures spaced annularly about the valve seat, and the valve seat can have a central opening through which the stem can extend.

In addition to the mentioned "first" chamber, the body can have a second chamber with an inlet and an outlet for fluid from the fluid line. The outlet of the valve seat and the inlet of the second chamber can be one and the same.

The assembly can have a further stem guide located within the second chamber for guiding the movement of the stem. The stem guide can extend from the valve seat and can comprise a sleeve containing a bush, such as a nylon bush, and the stem can extend through the sleeve.

If the assembly does not have a pressure relief valve for venting fluid from the first chamber, then pressure relief may be provided by the drive moving the sealing member from the valve seat or by a suitable pressure-relief mechanism described elsewhere in this specification.

The electrical components of the assembly can be wired in any suitable way known to persons skilled in the art.

The term "comprise", or variations of the term such as "comprises" or "comprising", are used herein to denote the inclusion of a stated integer or stated integers but not to exclude any other integer or any other integers, unless in the context or usage an exclusive interpretation of the term is required.

BRIEF DESCRIPTION OF THE DRAWINGS

Particular preferred embodiments of the invention will now be described by way of example with reference to the drawings in which:

FIG. 14 is a cross sectional view of part of a shut-off valve assembly according to an embodiment of the invention;

FIG. 15 is a top plan view of the assembly of FIG. 14; and

FIG. 16 is a bottom plan view of the assembly of FIG. 14.

BEST MODE AND OTHER MODES OF CARRYING OUT THE INVENTION

Figure 1:
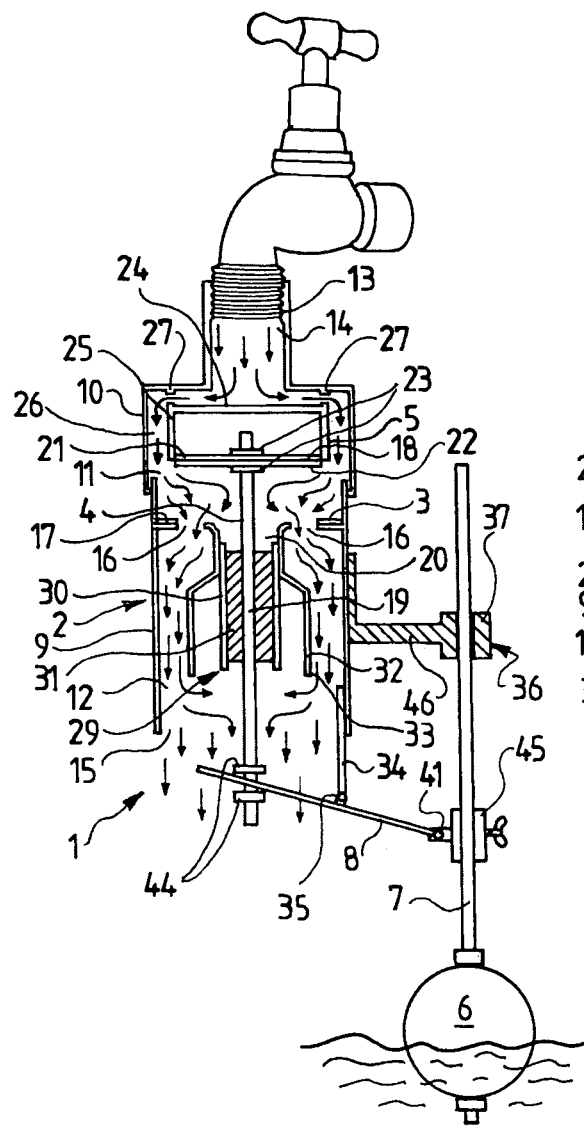
FIG. 1 is a cross sectional view of a shut-off valve assembly, in an open condition, connected to a tap, according to an embodiment of the invention.

In all of the drawings, like reference numerals refer to like parts.

Figure 2:
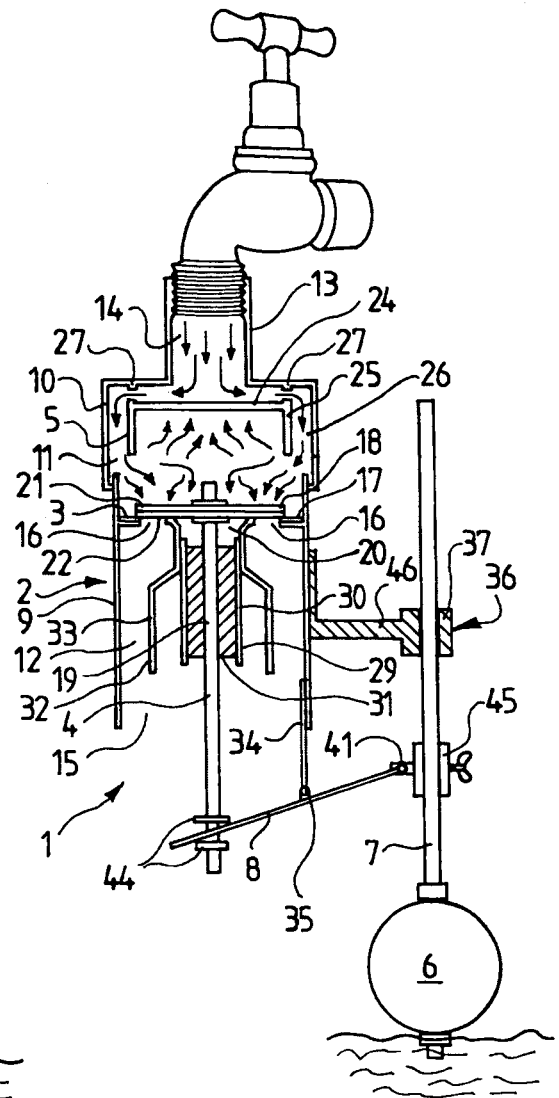
FIG. 2 is a cross sectional view of the shut-off valve assembly of FIG. 1 but in a closed condition.

FIGS. 1 and 2 show a shut-off valve assembly 1 for restricting the flow of water from a tap into a sink when the water level within the sink reaches a predetermined level. The assembly 1 is attachable to a threaded end of a tap and basically comprises a body 2, a valve seat 3, a baffle arrangement 5, 27, a valve member 4 and a drive 6, 7, 8.

The body 2 has an upper chamber 11 and a lower chamber 12. Upper chamber 11 has an inlet 14 for water from the tap and a plurality of outlets 16. Lower chamber 12 has a plurality of inlets, which are the same as the outlets 16 of the upper chamber 11, and an outlet 15. The body 2 has a cylindrical sidewall 9 and an end cap 10. The sidewall 9 and the end cap 10 are threaded (not illustrated) for attachment to one another. The end cap 10 has a spout 13, a free-end of which has inlet 14 and is threaded for attachment to the tap. The body 2 comprises brass or plastics material.

The valve seat 3 separates the upper chamber 11 from the lower chamber 12 and provides the outlets/inlets 16. The valve seat 3 is made of brass or plastics material and has a surface layer of neoprene 17. The outlets/inlets 16 of the valve seat 3 are primarily located at an outer peripheral region of the valve seat 3.

The valve member 4 has a sealing member 18 located within the upper chamber 11 and a stem 19 that extends through a central opening 20 of the valve seat 3 and through the outlet 15. The sealing member 18 comprises a brass or plastic support disk 21 and has a surface layer of neoprene 22. The neoprene layer 22 faces the valve seat 3. The stem 19 is rod-shaped and is attached to the sealing member 18 with retaining nuts 23. The stem 19 comprises brass or plastics material.

The baffle arrangement 5, 27 includes a baffle housing 5. The baffle housing 5 has a top wall 24 and a sidewall 25 extending therefrom. The baffle housing 5 together with the body 2 define passages 26 through which water from the inlet 14 can flow to the outlets 16.

The baffle housing 5 has perforated sidewalls 27 that extend between the top wall 24 and end cap 10 which serve to slow the flow of water to the outlets 16.

The assembly 1 has a stem guide 29 located within the lower chamber 12 for guiding the movement of the stem 19. The stem guide 29 has a brass or plastic sleeve 30 containing a nylon bush 31 and the stem 19 extends through the sleeve 30.

The drive 6, 7, 8 comprises a ball float 6, a float arm 7 and a pivot arm 8 for moving the sealing member 18 between a shielded position and an unshielded position.

The pivot arm 8 is connected to the stem 19 and is adjustably connected to the float 6. The pivot arm 8 is elongate and is made of brass or plastics material. The pivot arm 8 is adjustably connected to the float arm 7 by a clamp 45. The float arm 7 extends substantially parallel to the stem 19. The float arm 7 is rod-shaped and is made of plastics material.

The assembly 1 has a float arm guide 36 connected to the body 2 for guiding the movement of the float arm 7. The float arm guide 36 is connected to the body 2 by a brass or plastic spacer arm 46. The float arm guide 36 comprises a brass or plastic sleeve 37 containing a nylon bush and the float arm 7 extends through the sleeve 37.

The pivot arm 8 has a slot (not clearly shown) through which stem 19 extends. A retainer 44 is located each side of the slot. The other end of pivot arm 8 is received and retained within a slot 41 of clamp 45.

The assembly 1 has a deflector 32 located within the lower chamber 12 for deflecting water away from the stem guide 29 and for ensuring that a strong water stream does not impede movement of the pivot arm 8 The deflector 32 is of general cylindrical shape and has a lower region 33 that flares towards the sidewall 9 of the body 2. The deflector 32 is made of brass or plastics material. The deflector 32 extends from the valve seat 3 and the stem guide 29 is located within and connected to the deflector 32.

A sidewall extension 34 is connected to the pivot arm 8 at a point designated by numeral 35 and enables the pivot arm 8 to pivot relative to the body 2.

In use, the distance between the float 6 and the clamp 45 is first adjusted to suit the depth of the sink. This distance determines at what water level the sealing member 18 will seal the apertures 16. The assembly 1 is attached to the sink's tap. The tap is then turned on and water flows through inlet 14, through passages 26, through outlets 16 and through outlet 15. Initially, the sealing member 18 is in the shielded position whereby it is substantially shielded from the flowing water and sealingly engages the baffle housing 5 such that it is airtight. This is shown in FIG. 1. The inventor has found that the assembly works best if no water can flow between the baffle housing 5 and the sealing member 18 when the sealing member 18 is in the shielded position.

As the sink fills with water, the ball float 6 rises, the float arm 7 rises, the pivot arm 8 pivots, the stem 19 is pulled downwards by the pivot arm 8, and the sealing member 18 is pulled away from the baffle housing 5 towards the valve seat 3. At this point, water can flow between the sealing member 18 and the baffle housing 5 and there is an increase in water pressure on the support disk 21 of the sealing member 18. This increase in water pressure forces the sealing member 18 against the valve seat 3 and results in the sealing of outlets 16. This is shown in FIG. 2.

Figure 3:
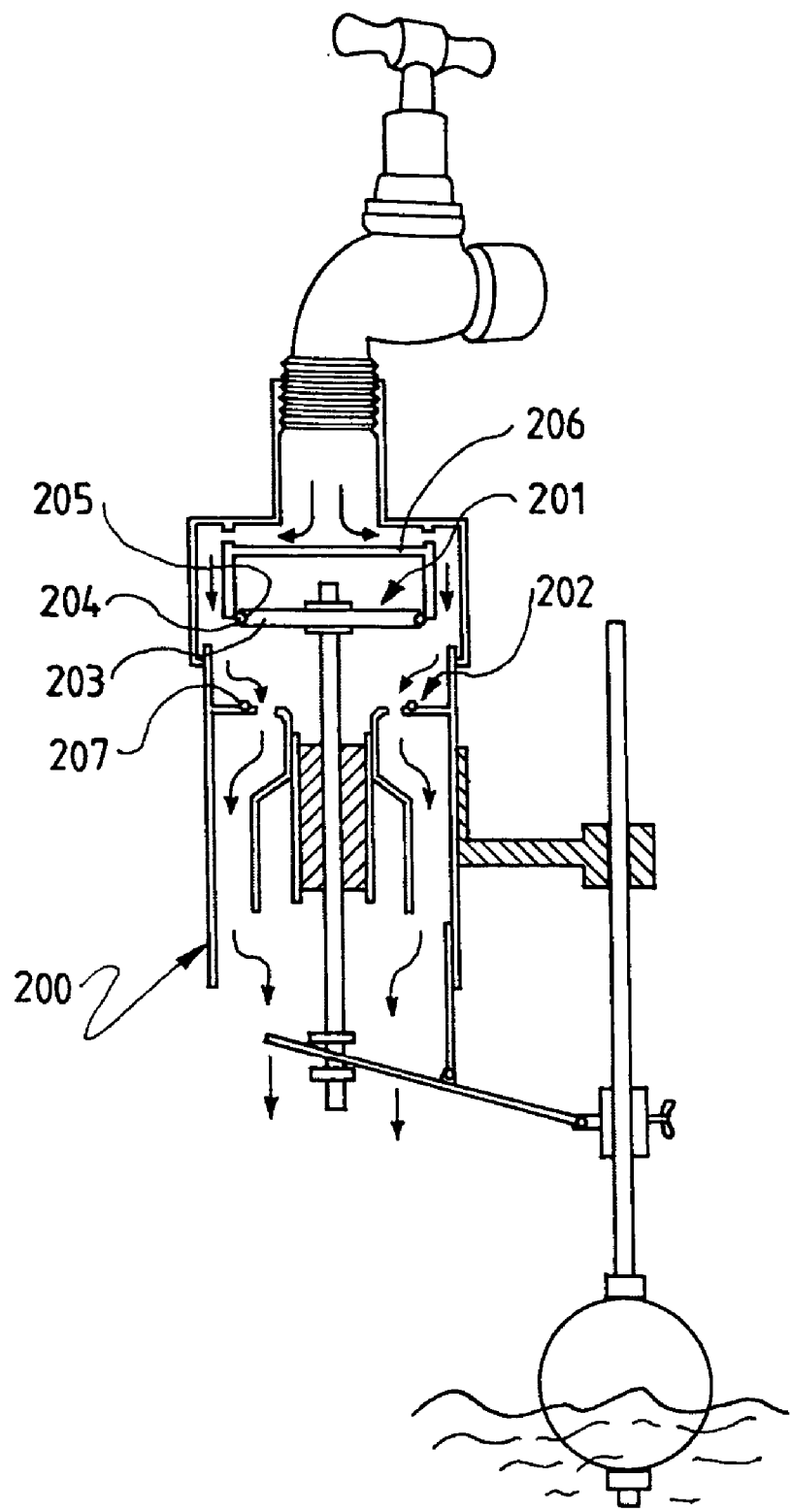
FIG. 3 is a cross sectional view of a shut-off valve assembly connected to a tap, according to an embodiment of the invention.

Referring now to FIG. 3, there is shown a shut-off valve assembly 200 that is virtually identical to assembly 1 except with respect to the scaling member 201 and the valve seat 202. The sealing member 201 comprises a support disk 203 and an O-ring 204 extends within a peripheral groove 205 of the disk 203. The valve seat 202 has an O-ring 207 facing the scaling member 201. O-ring 204 seals the baffle housing 206 when the sealing member 201 is in the shielded position.

Figure 4:
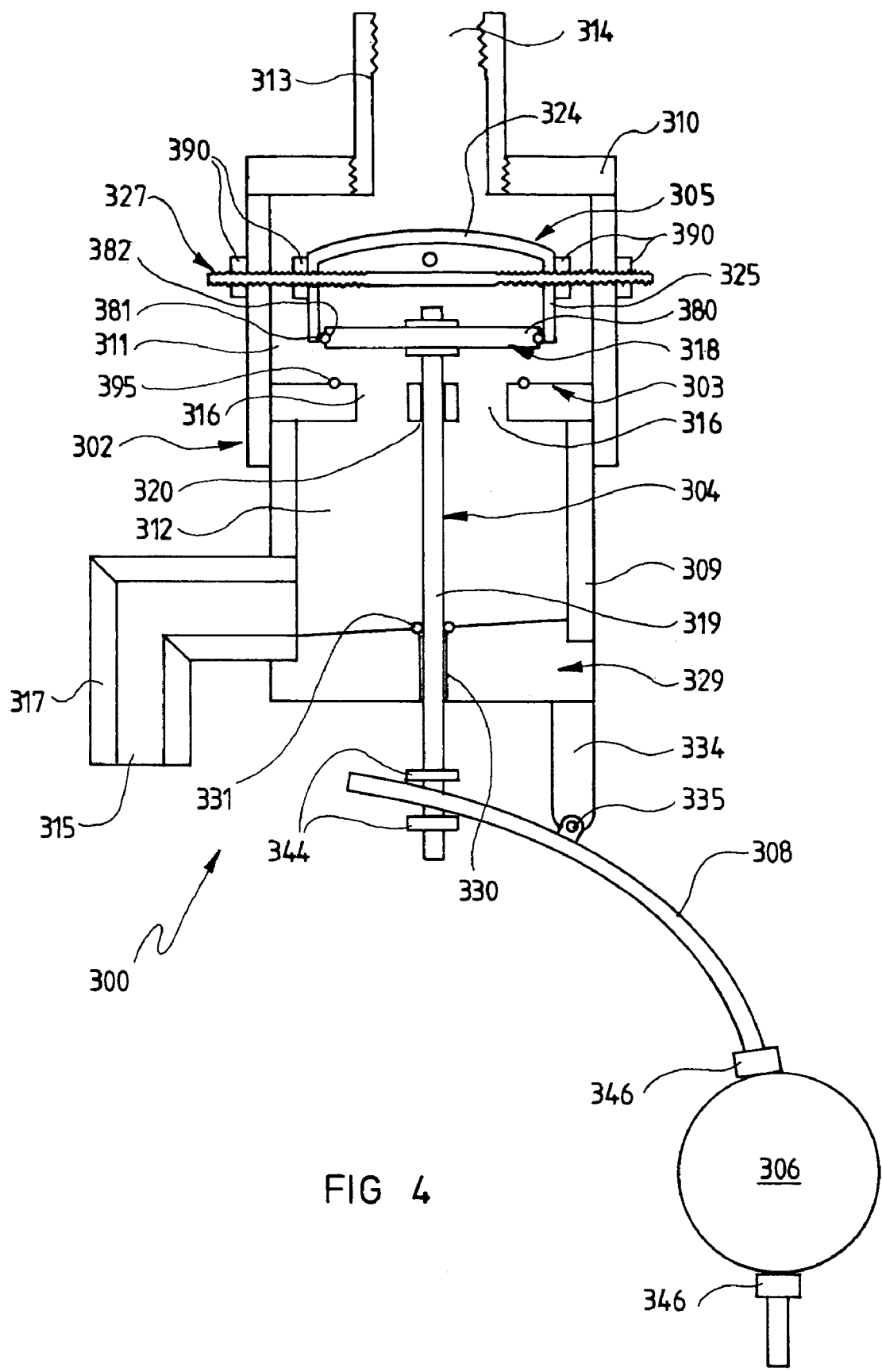
FIG. 4 is a cross sectional view of a shut-off valve assembly according to an embodiment of the invention.

FIG. 4 shows a shut-off valve assembly 300 for restricting the flow of water from a tap into a sink when the water level within the sink reaches a predetermined level. It operates in a similar manner to assemblies 1 and 200.

The assembly 300 is attachable to a threaded end of a tap and basically comprises a body 302, a valve seat 303, a baffle housing 305, a valve member 304 and a drive 306, 308.

The body 302 has an upper chamber 311 and a lower chamber 312. Upper chamber 311 has an inlet 314 for water from the tap and a plurality of outlets 316. Lower chamber 312 has a plurality of inlets, which are the same as the outlets 316 of the upper chamber 311, and an outlet 315. The valve seat 303 has an O-ring 395 facing the sealing member 318. The body 302 has a cylindrical sidewall 309 and an end cap 310. The end cap 310 has a spout 313, a free-end of which has inlet 314 and is threaded for attachment to the tap. A spout 317 extends from sidewall 309, a free-end of which has outlet 315.

The valve member 304 has a sealing member 318 and a stem 319 that extends through a central opening 320 of the valve seat 303. The sealing member 318 comprises a support disk 380 and an O-ring 381 extends within a peripheral groove 382 of the disk 380.

The baffle housing 305 has a curved top wall 324 and a sidewall 325 extending therefrom. The baffle housing 305 together with the body 302 define passages through which water from the inlet 314 can flow to the outlets 316.

A bolt 327 extends transversely through the baffle housing 305 and cylindrical sidewall 309, and nuts 390 hold the baffle housing 305 in position within the upper chamber 311.

The assembly 300 has a stem guide 329 for guiding the movement of the stem 319. The stem 319 extends through an O-ring 331 and an opening 330 of the stem guide 329. The stem guide 329 seals the lower chamber 312 such that water must flow through outlet 315.

The drive 306, 308 comprises a ball float 306 and a pivot arm 308 for moving the sealing member 318 between a shielded position and an unshielded position.

The pivot arm 308 is connected to the stem 319 and retainers 346 adjustably connect the float 306 to the pivot arm 308. The position of the float 306 is adjustable so that the predetermined level can be adjusted for different sinks, basins etc.

The pivot arm 308 has a slot (not clearly shown) through which stem 319 extends. A retainer 344 is located each side of the slot and they allow for some movement of the pivot arm 308 relative to the stem 319.

An extension 334 of stem guide 329 is connected to the pivot arm 308 at a point designated by numeral 335 and enables the pivot arm 308 to pivot relative to the body 302.

In use, the position of the float 306 is first adjusted to suit the depth of the sink. The assembly 300 is attached to the sink's tap. The tap is then turned on and water flows through inlet 314, through outlets 316 and through outlet 315. Initially, the sealing member 318 is in the shielded position whereby it is in contact with the baffle housing 305 and seals the baffle housing 305 such that it is airtight. This is shown in FIG. 4.

As the sink fills with water, the ball float 306 rises, the pivot arm 308 pivots, the stem 319 is pulled downwards by the pivot arm 308, and the sealing member 318 is pulled away from the baffle housing 305 towards the valve seat 303. At this point, water can flow between the sealing member 318 and the baffle housing 305, and increased water flow over the top of the sealing member 318 forces the scaling member 318 hard up against the valve seat 303.

Figure 6:
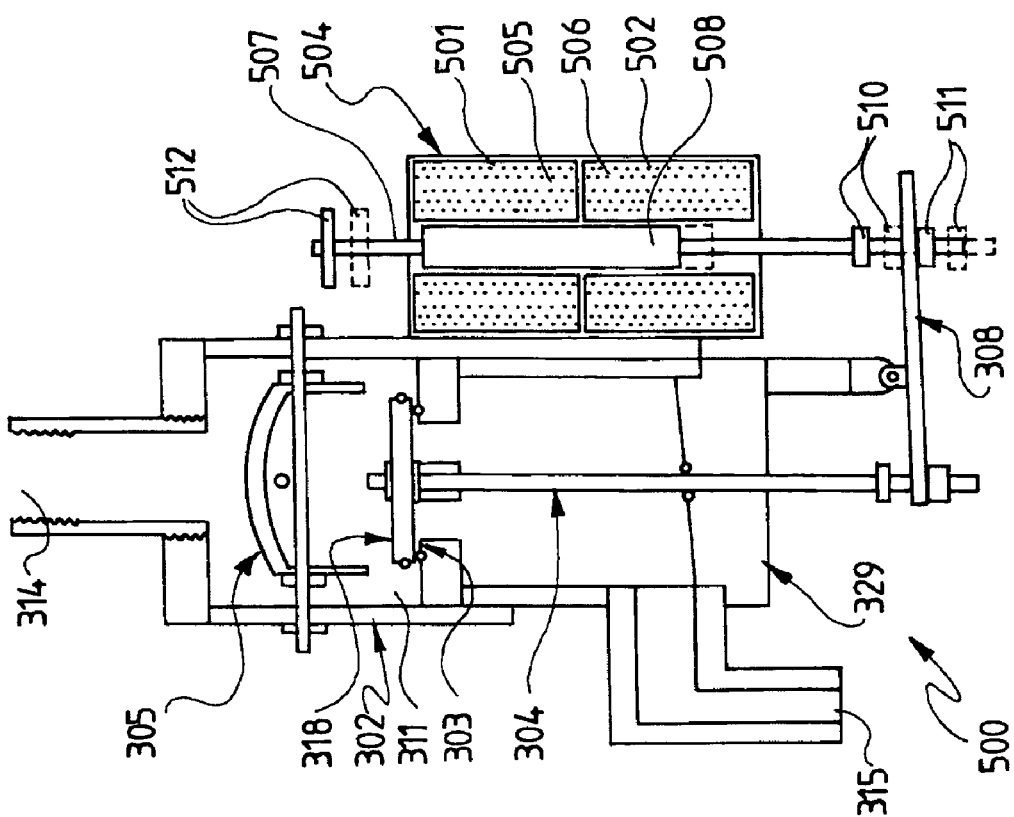
FIG. 6 is a cross sectional view of the shut-off valve assembly of FIG. 5 but in a closed condition.
Figure 5:
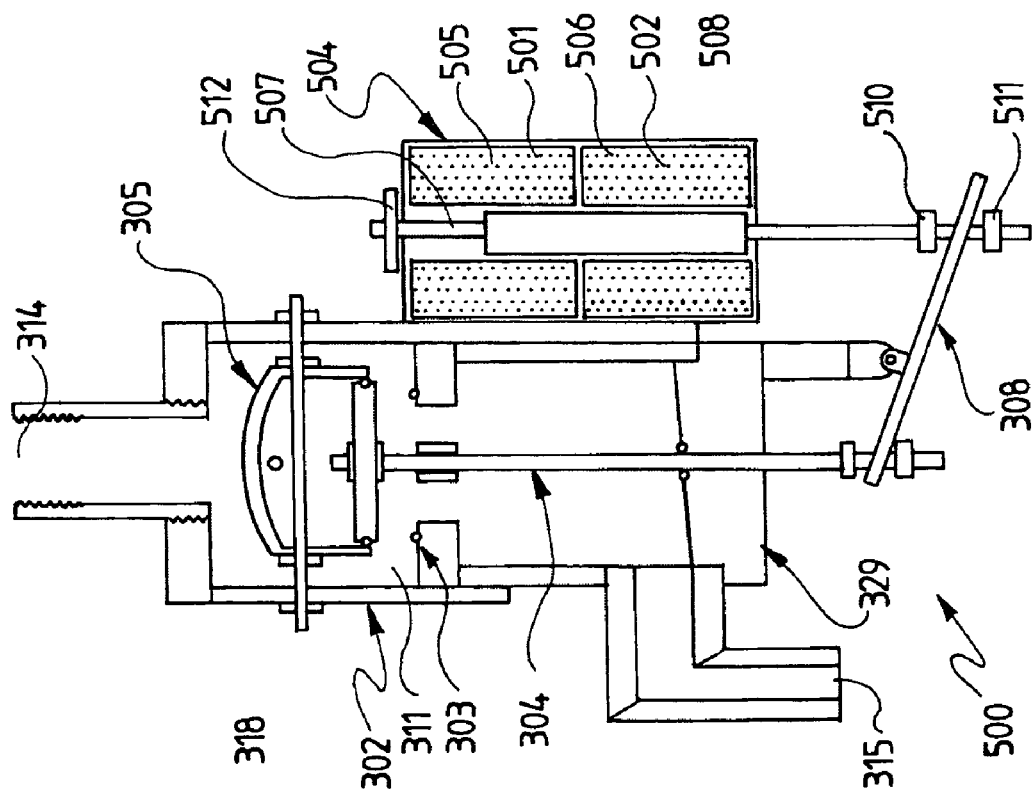
FIG. 5 is a cross sectional view of part of a shut-off valve assembly in an open condition according to an embodiment of the invention.

FIGS. 5 and 6 show a shut-off valve assembly 500 for restricting the flow of water from a tap into a sink when the water level within the sink reaches a predetermined level. The assembly 500 has most of the features described for assembly 300, except for the fact that the drive includes a pair of solenoids 501, 502 instead of a float.

A casing 504 containing the solenoids 501, 502 is attached to the cylindrical sidewall 309 of the body 302. Each solenoid 501, 501 has a magnetic coil 505, 506. A rod 507 having a metal bar 508 connected thereto extends through each magnetic coil 505, 506. Retainers 510, 511 connect a lower end of the rod 507 to the pivot arm 308. Retainer 512 is connected to an upper end of the rod 507 and ensures that the metal bar 508 extends through each magnetic coil 505, 506.

FIG. 5 shows the shut-off valve assembly 500 in an open condition wherein the sealing member 318 is in a shielded position, whereas FIG. 6 shows the shut-off valve assembly 500 in a closed condition wherein the sealing member 318 is in an unshielded position. In use, when solenoid 501 is de-energized and solenoid 502 is energized, then the sealing member 318 moves to the shielded position. When solenoid 501 is energized and solenoid 502 is de-energized, then the sealing member 318 moves to the unshielded position whereby it is in a position to be forced against the valve seat 303 by water flowing through the upper chamber 311 When neither solenoid 501, 502 is energized, the sealing member 318 moves to the unshielded position. Since assembly 500 lacks a float, it may have any suitable sensor system as described hereafter in respect of the other preferred embodiments of the invention.

Figures 7, 8:
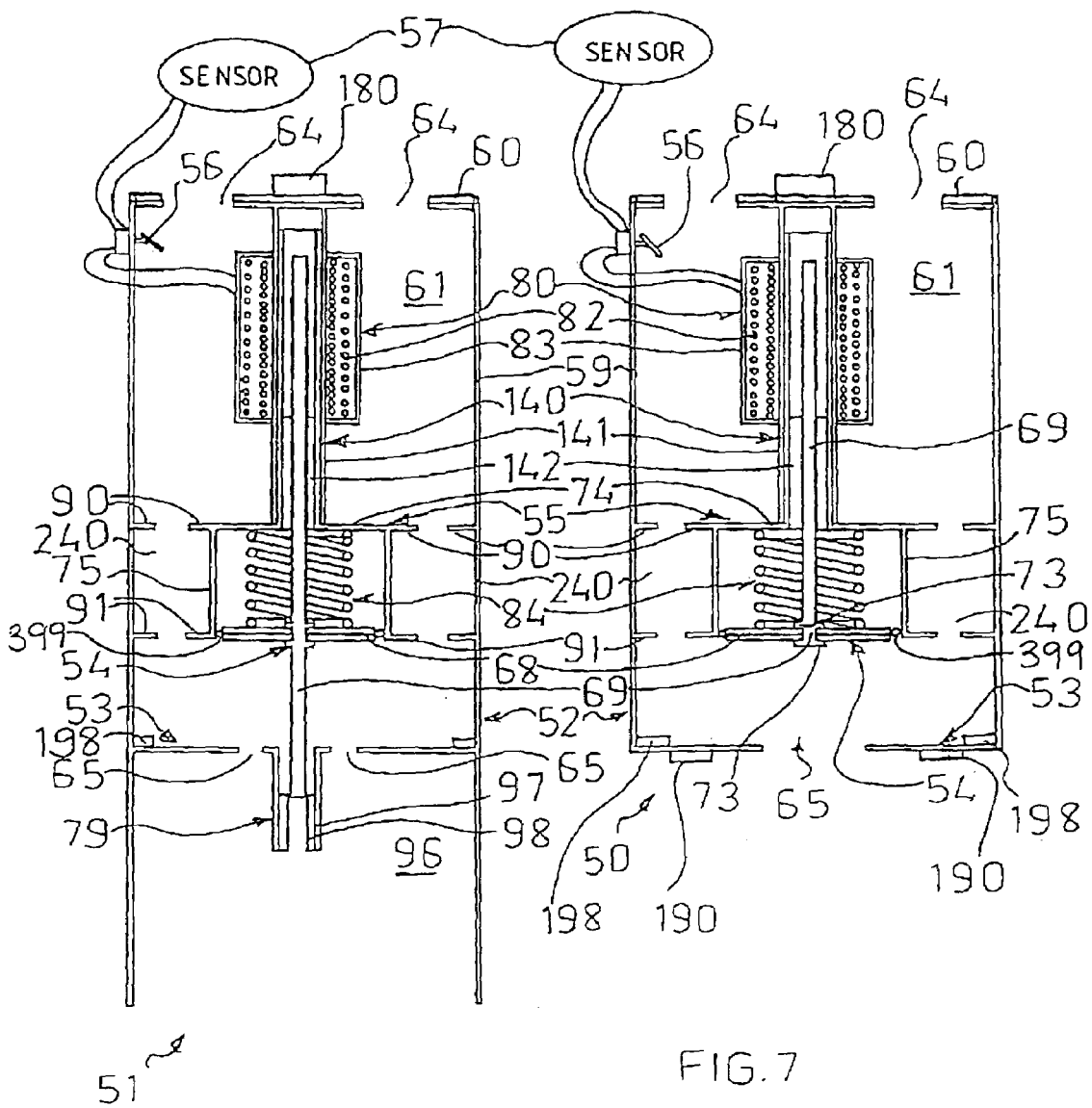
FIG. 7 is a cross sectional view of part of a shut-off valve assembly according to an embodiment of the invention.
FIG. 8 is a cross sectional view of part of a shut-off valve assembly according to an embodiment of the invention.

Referring now to FIG. 7, there is shown part of another embodiment of a shut-off valve assembly 50 for restricting the flow of water from a tap into a sink when the water level within the sink reaches a predetermined level.

The assembly 50 comprises a body 52, a valve seat 53, a baffle arrangement 55, 90, 91 (only partly labeled), a valve member 54, a drive 80, 84, and a sensor system including a first sensor 57 and a second sensor 56.

The body 52 fits within a part of the tap or to an end of the tap. This may be achieved by having part of the body 52 threaded. The body 52 has a chamber 61 with inlets 64 and an outlet 65 for water from the tap. The body 52 has a cylindrical sidewall 59 and an attachable end cap 60. The end cap 60 has a plurality of apertures 64 that provide the inlets 64 and a hexagonal head 180 that can be engaged by a tool when attaching or detaching the end cap 60. The body 52 comprises brass or plastics material.

The valve seat 53 provides outlet 65 in the form of a central aperture 65. The valve seat 53 is made of brass or plastics material and has a surface layer of neoprene (not labelled). The valve seat 53 is threaded for attachment to a threaded lower end of the body 52 (not shown). A lower surface of the valve seat 53 has gripping tabs 190 for enabling the valve seat 53 to be screwed into engagement with the body 52. The surface layer of neoprene seals against a circumferential rim 198 of the body 52.

The valve member 54 has a sealing member 68 located within the chamber 61 and a stem 69 extending therefrom. The sealing member 68 comprises a brass or plastic support disk and has a surface layer of neoprene (not labelled). The neoprene layer faces the neoprene layer of the valve seat 53. The stem 69 is rod-shaped and is attached to the sealing member 68 with retaining nuts 73. The stem 69 comprises brass or plastics material.

The baffle arrangement 55, 90, 91 includes a baffle housing 55 for substantially shielding the sealing member 68 from a water stream moving from inlets 64 to outlet 65 when the tap has been turned on. The baffle housing 55 has a top wall 74 and a sidewall 75 extending therefrom. Sealing member 54 has an O-ring 399. The O-ring 399 ensures that when the sealing member 54 is in the shielded position, the baffle housing 55 is airtight.

The baffle housing 55 together with the body 52 define passages 240 through which water can flow. The baffle housing 55 has perforated walls 90, 91 that extend between sidewall 75 and sidewall 59 of the body 52, and these serve to slow the flow of water to the outlet 65. The baffle housing 55 can comprise brass or plastics material.

The drive 80, 84 comprises a solenoid 80 having a magnetic coil 82 hermetically sealed within a casing 83. The drive 80, 84 also includes a coil spring 84 that extends between the baffle housing 55 and the sealing member 68. The solenoid 80 is located between the inlet 64 and the baffle housing 55. The magnetic coil 82 and spring 84 are each wound about the stem 69. The solenoid 80 is powered by any suitable power source, whether it is a mains supply, a battery, A.C. or D.C.

The assembly 50 has a stem guide 140 located within the chamber 61 for guiding the movement of the stem 69. The stem guide 140 extends between the top wall 74 of the baffle housing 55 and the solenoid 80 and comprises a sleeve 141 containing a nylon bush 142.

Sensor 56 is used to sense the flow of water through chamber 61 and sensor 57 is used to sense the level of water within the sink. Sensor 56 is a flow switch 56 that closes an electrical circuit to energize the solenoid 80 when water is flowing through the chamber 61, and if water is not flowing through the chamber 61 then the circuit is opened and the solenoid 80 is de-energized. The flow switch 56 is mounted to sidewall 59 of the body 52.

Sensor 57 is wired such that it is only operational when the flow switch 56 senses water flowing through the chamber 61. That is, when the flow switch 56 senses water flow, then an electrical circuit with sensor 57 is closed.

Sensor 57 is also wired such that when it does sense water, the solenoid 80 is de-energized. That is, when sensor 57 is triggered, an electrical opened.

FIG. 8 shows part of another embodiment of the assembly 51 that is virtually identical to assembly 50, except that the body 52 has a second chamber 96 with multiple inlets 65 and a further stem guide 79 for guiding the movement of the stem 69. The stem guide 79 has a brass or plastic sleeve 97 containing a nylon bush 98 and the stem 69 extends through the sleeve 97.

Assembly 50 or 51 can have a pressure relief valve for venting water from the chamber 61 after the outlet 65 or outlets 65 have been sealed. Alternatively, the valve member 54 of each assembly 50, 51 can be adapted such that water slowly leaks between the sealing member 68 and stem 69.

Figure 9:
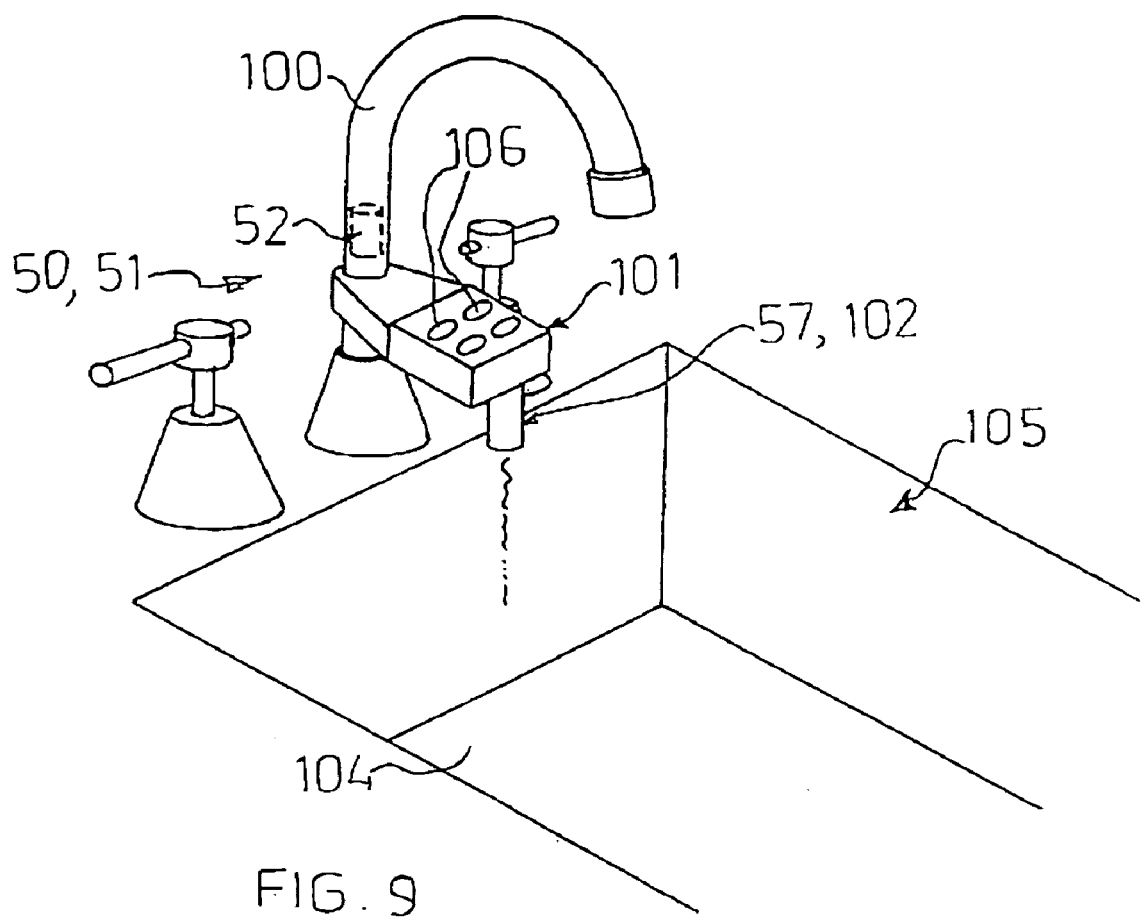
FIG. 9 is a part detailed perspective view of a shut-off valve assembly connected to a tap and sink, according to an embodiment of the invention.
Figure 10:
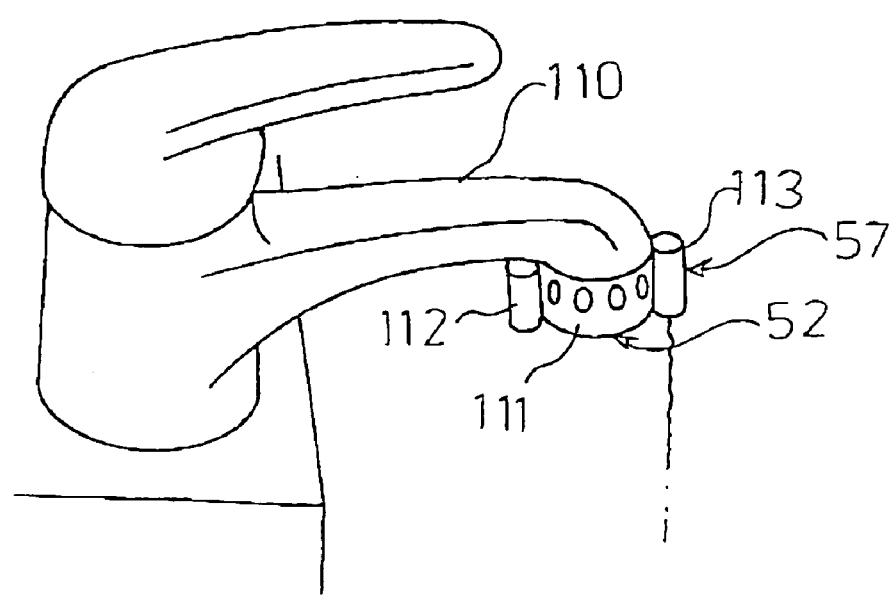
FIG. 10 is a perspective view of a shut-off valve assembly according to an embodiment of the invention.

FIGS. 9 and 10 show that sensor 57 can comprise a laser sensor that directs a laser beam towards a bottom wall of a sink, and when the water reaches a predetermined level within the sink, the laser sensor de-energizes the solenoid 80.

FIG. 9 shows the assembly 50 or 51 fitted to a tap 100 and sink 105. The body 52 is fitted within a neck of tap 100 and sensor 57 is part of a combined keypad/display and laser sensor unit 101 which is connected to tap 100 by way of a bracket. The unit 101 is powered by an internal battery. A laser sensor 102 is located at a bottom of the unit 101 and directs a laser beam towards a bottom wall 104 of the sink 105. The keypad/display part of the unit 101 has keys 106 for setting the level of water that the sink 105 is to contain, by varying the characteristics of the laser beam produced by sensor 102. The beam can be set such that the sensor 102 can detect, for instance, a sink 105 partly filled or fully filled with water. When the water reaches the predetermined level within the sink 105, the laser sensor 102 de-energizes the solenoid 80.

FIG. 10 shows that the body 52 can be screwed onto an end of a tap 110 and that a keypad/display unit 111, a battery holder 112 and a laser sensor 113 are mounted to the body 52. The laser sensor 113 directs a laser beam towards a bottom wall of a sink. The keypad/display unit 111 is programmable with regard to water level settings and also displays the charge on the battery.

Figure 11:
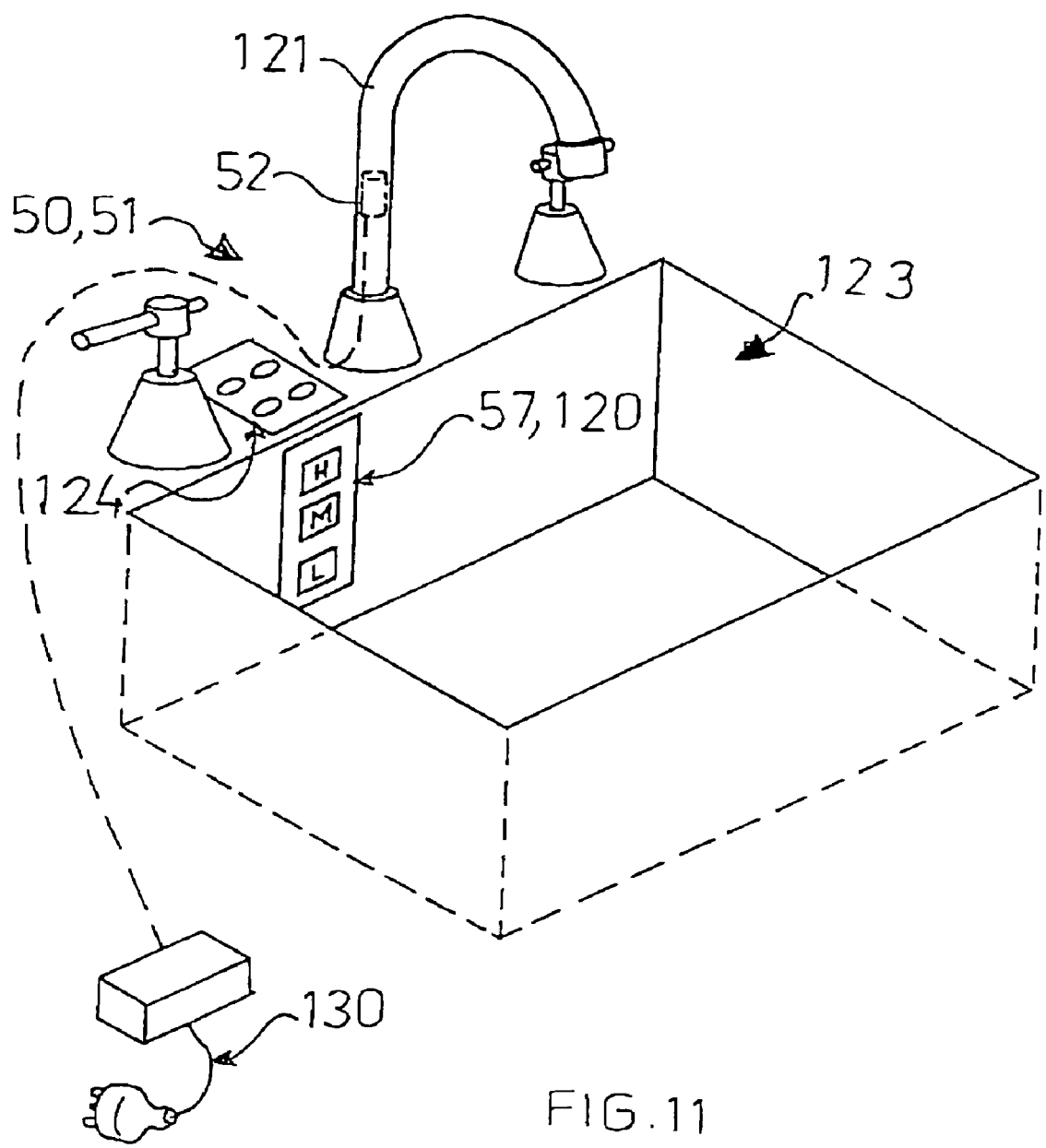
FIG. 11 is a part detailed perspective view of a shut-off valve assembly connected to a tap and sink, according to an embodiment of the invention.

Referring now to FIG. 11, there is shown another embodiment of the sensor 57 for assembly 50 or 51. This figure shows the body 52 fitted within a neck of a tap 121 and the tap 121 is mounted to a sink 123. Sensor 57 comprises a touch mat 120 that is attached to the sink 123 by way of suction cups, and a keypad/display unit 124 is mounted to a top rim of the sink 123. The solenoid 80, the touch mat 120 and the keypad/display unit 124 are powered by a mains supply 130. The touch mat 120 has low "L", medium "M" and high "H" settings.

Referring now to any one of FIGS. 7–11, in use, the body 52 is attached to or fitted within a part of a tap, the tap is turned on, water flows through chamber 61, flow switch 56 is triggered, solenoid 80 is energized and sealing member 68 is moved to the shielded position such that the baffle housing 55 is sealed. With water flowing through the chamber 61, sensor 57 (ie. The touch mat or laser sensor) is operational. The keypad/display unit is used to set the water level at which the sealing member 68 will seal against the valve scat 53. When the predetermined water level is reached, the circuit between sensor 57 and the solenoid 80 is opened and the solenoid 80 de-energizes. With the solenoid 80 de-energized, the spring 84 moves the sealing member 68 out of the baffle housing 55 to an unshielded position, and water flowing through the chamber 61 flows between the sealing member 68 and the baffle housing 55 to force the sealing member 68 against the valve seat 53 to seal the outlet/s 65.

Figure 12:
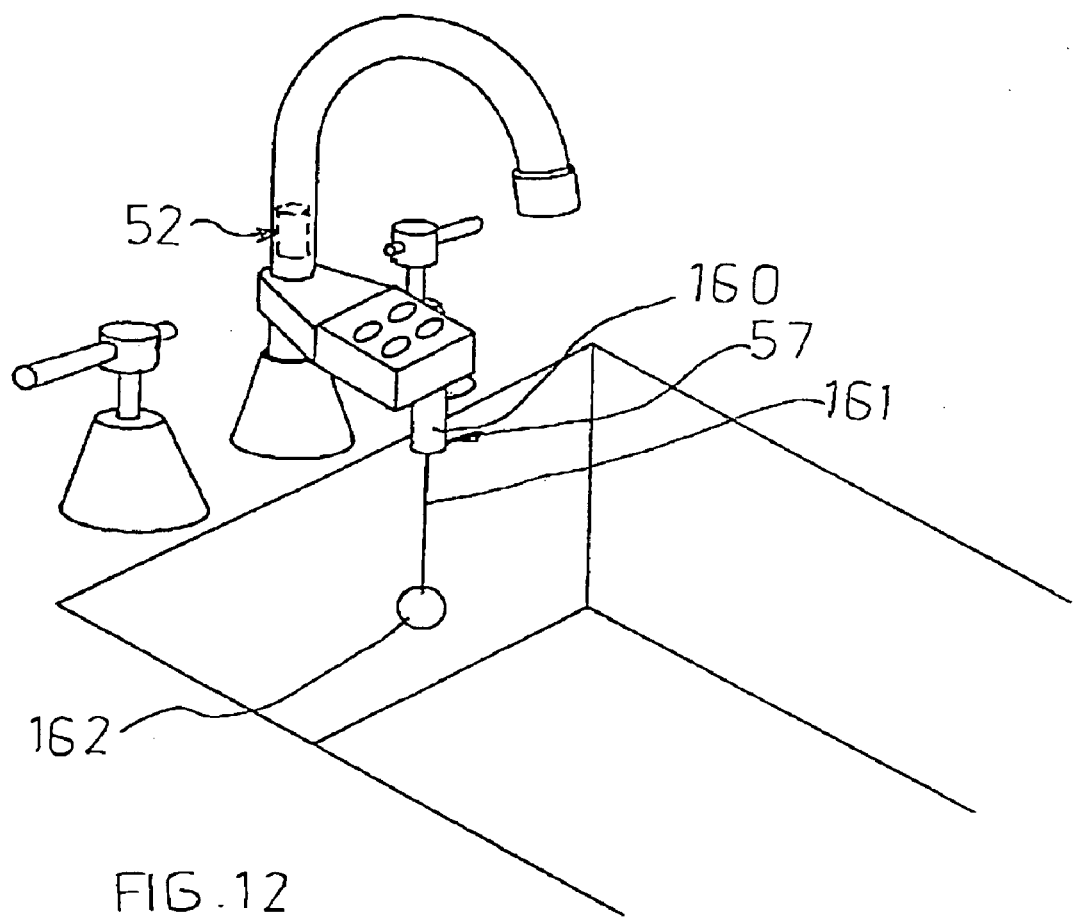
FIG. 12 is a part detailed perspective view of a shut-off valve assembly connected to a tap and sinks according to an embodiment of the invention.
Figure 13:
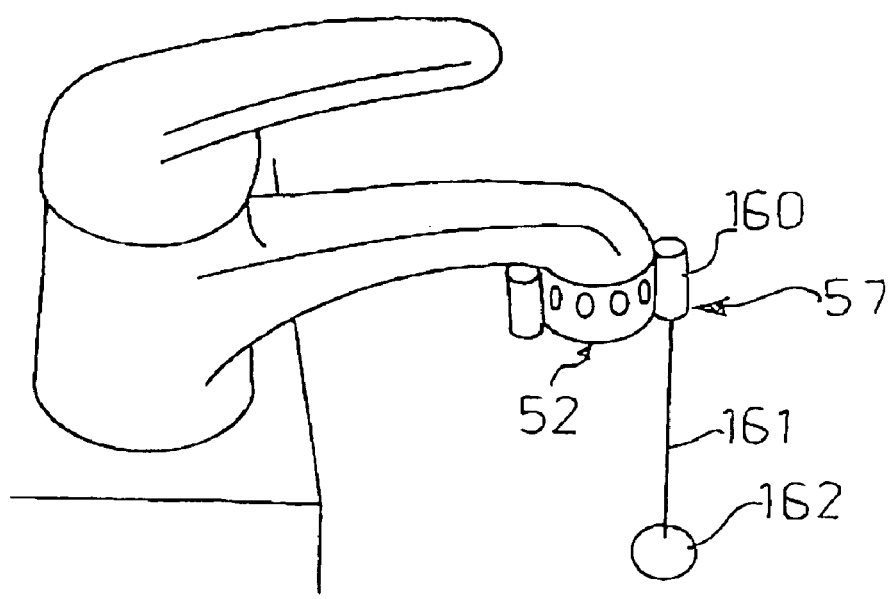
FIG. 13 is a perspective view of a shut-off valve assembly according to an embodiment of the invention.

Referring now to FIGS. 12 and 13, there is shown another embodiment of sensor 57 comprising a micro-switch and float arrangement. In FIG. 12, the laser sensor 102 of FIG. 9 has been replaced with a micro-switch 160, an arm 161 of adjustable length and a ball float 162. In FIG. 13, the laser sensor 113 of FIG. 10 has been replaced with a micro-switch and float sensor 160–162.

In use, the arm 161 is adjusted to the required length and is attached to the micro-switch 160. When the ball float 162 rises with the water in the sink to the predetermined level, the arm 161 triggers the micro-switch 160, the solenoid 80 de-energizes, and the valve member 68 seals against the outlet/s 65.

In this way, the sink will not overfill with water and the wastage of water is minimized.

FIGS. 14–16 show a shut-off valve assembly 201 that is particularly suitable for stopping the flow of fluid from or within a fluid line, such as the flow of water through a tap or shower head or oil through a pipeline. The assembly 201 is very similar to assembly 50 shown in FIG. 2.

Assembly 201 has differences lo assembly 50 in that sensor 57 is replaced with a drive controller for selectively energizing and de-energizing the solenoid 80. The drive controller includes flow switch 56. Furthermore, assembly 201 has a pressure-relief arrangement 202–207 for venting water from the chamber 61 after the sealing member 68 has sealed the outlet 65. Without the pressure relief arrangement, some solenoids 80 may not be able to lift the sealing member 68 from the valve seat 53.

In a first embodiment, the drive controller comprises a rechargeable battery (not shown) that has enough charge to energize the solenoid 80 for a predetermined period of time, say, 10, 20, 30 or 40 minutes. The solenoid 80 is energized once the flow switch 56 is closed by the passage of water through the chamber 61. When the battery runs out of power, the solenoid 80 de-energizes and the sealing member 68 seals the outlet 65.

In a second embodiment, the drive controller comprises a programmable timer (not shown) that shuts off power to the solenoid 80 after a predetermined period of time. The timer can be attached to the body 52 or can be remote from the body 52.

In third embodiment, the drive controller comprises a timer that is programmable by way of a remote EFTPOS terminal. A user can program the timer for a select period of time after swiping a credit card through the EFTPOS terminal. The user can pay for a predetermined period of time which begins at the time that the flow switch 56 is activated by flowing water.

In a fourth embodiment, the drive controller comprises signal (eg. radio, microwave, infrared) transmitting/broadcasting and receiving units for operating the solenoid 80 from a distance, say, by satellite.

The pressure-relief arrangement 202–207 for the chamber 61 comprises a second scaling member 203 attached to the stem 69, a coil spring 207 wound around the stem 69, and a housing 202 for the second sealing member 203 having a valve scat 204 and fluid inlets 205 adjacent to the valve seat 204. When chamber outlet 65 is sealed, the second sealing member 203 seals valve seat 204 and extends from within the baffle housing 55. In order to de-pressurise the chamber 61, the solenoid 80 is energized to cause the second scaling member 203 to move from its valve seat 204 and for water to flow (as shown in FIG. 14) through fluid inlets 205 between the sealing members 68, 203 and through a central aperture 206 of valve seat 204, at which point the solenoid 80 is able to move sealing member 68 to a shielded position adjacent the baffle housing 55 and to retract the housing 202 within the baffle arrangement 55.

The valve seat 53 has an O-ring 600 and an O-ring 601, 602 is located either side of the valve seat 204 of the housing 202 such that there can be a fluid-tight seal between respective valve seats 53, 204 and scaling members 68, 203.

In order to seal the valve seat outlet 65, solenoid 80 is de-energized and the springs 84, 207 move the sealing member 68 to an unshielded position distal of the baffle housing 55, at which point water can flow between sealing member 68 and valve seat 204, between sealing member 203 and a top wall (not labeled) of the housing 202, as well as between housing 202 and baffle housing 55. The water pressure forces the sealing member 68 against the valve seat 53 to seal the outlet 65.

Assembly 201 may be of particular use in the hotel industry in answer to the problem of some guests using excessive amounts of hot water. That is, assembly 201 enables the amount of hot water used by a guest to be monitored and regulated, and the guest can be charged based on the amount of water consumed.

Alternatively, multiple assemblies 201 can fitted within an oil pipeline and the flow of oil within the pipeline can be regulated as required This may be of importance if a section of the pipeline requires maintenance and the flow of oil needs to be stopped. The solenoid 80 of each assembly 201 can be controlled remotely by way of satellite.

Whilst the above has been given by way of illustrative example of the invention, many modifications and variations may be made thereto by persons skilled in the art without departing from the broad scope and ambit of the invention as herein set forth.

What is claimed is:

1. A shut-off valve assembly for regulating the flow of fluid through or from a fluid line, said assembly comprising:

a body attachable to or within a fluid line and having at least one chamber therein with at least one inlet and one outlet for fluid from the fluid line;

a valve seat that provides the outlet;

a baffle arrangement comprising a baffle housing located within the chamber;

a valve member having a sealing member movable between a shielded position, whereby the sealing member seals an interior of the baffle housing in a fluid tight manner and is substantially shielded by the baffle housing from a fluid stream moving from said inlet to said outlet and in which position the sealing member is not movable by the fluid stream against the valve seat, and an unshielded position whereby the sealing member does not seal the interior of the baffle housing and is movable by the fluid stream against the valve seat to seal the outlet; and a drive for moving the sealing member between the shielded and unshielded positions.

2. The shut-off valve assembly of claim 1, wherein the baffle housing comprises a top wall and a side wall extending from the top wall.

3. The shut-off valve assembly of claim 1, wherein the valve member further comprises a stem extending from the sealing member and the sealing member is disk shaped.

4. The shut-off valve assembly of claim 3, wherein the drive is operatively connected to the stem.

5. A shut-off valve assembly for restricting the flow of fluid from a fluid line into a receptacle when the fluid level within the receptacle reaches a predetermined level, said assembly comprising:

a body attachable to a fluid line and having an upper chamber and a lower chamber therein each with at least one inlet and one outlet for fluid from the fluid line;

a valve seat that provides the outlet for the upper chamber;

a baffle arrangement comprising a baffle housing located within the upper chamber;

a valve member having a sealing member movable between a shielded position, whereby said sealing member seals an interior of the baffle housing in a fluid tight manner and is substantially shielded by the baffle housing from a fluid stream moving from the upper chamber inlet to the upper chamber outlet and in which position the sealing member is not movable by the fluid stream against the valve seat, and an unshielded position, whereby the sealing member does not seal the interior of the baffle housing and is movable by the fluid stream against the valve seat to seal the upper chamber outlet; and a drive, comprising a float pivotally connected to the valve member, for moving the sealing member between the shielded and unshielded positions, with the construction and arrangement being such that when the float rises with the fluid level in a receptacle to a predetermined level, the sealing member moves to the unshielded position.

6. The assembly of claim 5, wherein the baffle housing comprises a top wall and a side wall extending from the top wall.

* * * * *